United States Patent
Chen et al.

(10) Patent No.: US 7,881,457 B1
(45) Date of Patent: Feb. 1, 2011

(54) APPARATUS AND METHOD OF SINGLE-IN-LINE EMBEDDED MODEM

(75) Inventors: KongChen Chen, San Jose, CA (US); Simon S. C. Chen, Milpitas, CA (US)

(73) Assignee: Wintec Industries, Inc., Fremont, CA (US)

( * ) Notice: Subject to any disclaimer, the term of this patent is extended or adjusted under 35 U.S.C. 154(b) by 2382 days.

(21) Appl. No.: 10/375,226

(22) Filed: Feb. 26, 2003

(51) Int. Cl.
 *H04M 1/00* (2006.01)
(52) U.S. Cl. .............................. 379/399.01; 379/93.05; 379/387.01
(58) Field of Classification Search .............. 379/93.05, 379/93.06, 93.1, 93.26, 387.01, 399.01; 439/620.15–620.2, 439/55, 59–62, 65, 68, 951, 625
See application file for complete search history.

(56) References Cited

U.S. PATENT DOCUMENTS

| | | | | |
|---|---|---|---|---|
| 4,823,312 A | * | 4/1989 | Michael et al. | 710/71 |
| 5,386,438 A | * | 1/1995 | England | 375/377 |
| 5,423,697 A | * | 6/1995 | MacGregor | 439/638 |
| 5,754,411 A | * | 5/1998 | Woychik | 361/803 |
| 5,978,873 A | * | 11/1999 | Phan | 710/300 |
| 6,201,865 B1 | * | 3/2001 | Dupuis et al. | 379/393 |
| 6,379,193 B1 | * | 4/2002 | Fujii et al. | 439/680 |

OTHER PUBLICATIONS

Dallas Semiconductor, Application Note 83, Fundamentals of RS-232 Serial Communications (Mar. 9, 1998) 9 pp.
Miniature FM Radio Modules, (Jan. 2003) Embedded Systems Programming, 1 pg.
Socket modem, VIP E.S., Mississauga, Ontario, CA, 1 pg, Jun. 14, 2004.
56K90 (R & T), Modems, Conexant's Socket Modem, internet page, 1 pg. Jun. 14, 2004.
"Wintec Dip Modem", www.insight-electronics.com/wintec, Insight Memec, 2 pp., Jun. 14, 2004.

* cited by examiner

*Primary Examiner*—Walter F Briney, III
(74) *Attorney, Agent, or Firm*—IP Strategy Group, P.C.

(57) ABSTRACT

The invention is a compact embedded modem that meets global telephone standards with its interface constructed in a single-in-line form factor. The modem in single-in-line form factor, namely SIP modem, can be integrated into a host system through a single-in-line header socket. The SIP interface includes TIP and RING signals for connecting to a phone line, isolation spacers, ground pin, power pin, and digital signals for transferring data to and from the host. The digital interface can be configured to operate in serial connection or in parallel connection to the host, selectable by user.

34 Claims, 5 Drawing Sheets

Single-in-Line (SIP) Embedded Modem 300

Figure 1 (Prior Art)

Interface Pin Placement on DIP modem

Figure 2

Single-in-Line (SIP) Embedded Modem 300

Figure 3

Figure 4A: Vertical-Mountable SIP Modem

Figure 4B: Horizontal-Mountable SIP Modem

A 20-pin Interface for SIP modem:

Figure 5

APPARATUS AND METHOD OF SINGLE-IN-LINE EMBEDDED MODEM

FIELD OF INVENTION

The present invention relates to an apparatus and method of an embedded modem in a single-in-line interface that supports the operation in either serial mode or parallel mode.

BACKGROUND OF THE INVENTION

The use of modems is well known in data communication industry. Modems convert digital data to a modulated analog waveform that can be transmitted over a phone line and also receive from the phone line a modulated analog signal that is then converted to digital data. Initially designed to connect data terminals to host computers, modems are commonly seen today in many devices that require inexpensive, secure network connectivity. Examples include point-of-sale terminals, medical instruments, home satellite receivers, embedded control systems, remote diagnostics/maintenance, and web-enabled devices. Modems used in these devices are embedded modems. An embedded modem is different from a PC add-on card modem, which includes a standard bus interface, such as ISA bus or PCI bus, that can be plugged into a motherboard expansion slot. Most PC added-on card modems are soft modems, which leverage the huge computing power of CPU in PC to emulate the modem data communication protocol without the need of a special modem digital signal processor (DSP). An embedded modem is also different from a stand alone modem, which is connected to a system serial port through an external cable to perform serial communication functions. The physical size of an external modem is not a critical design constraint.

Figure 1:
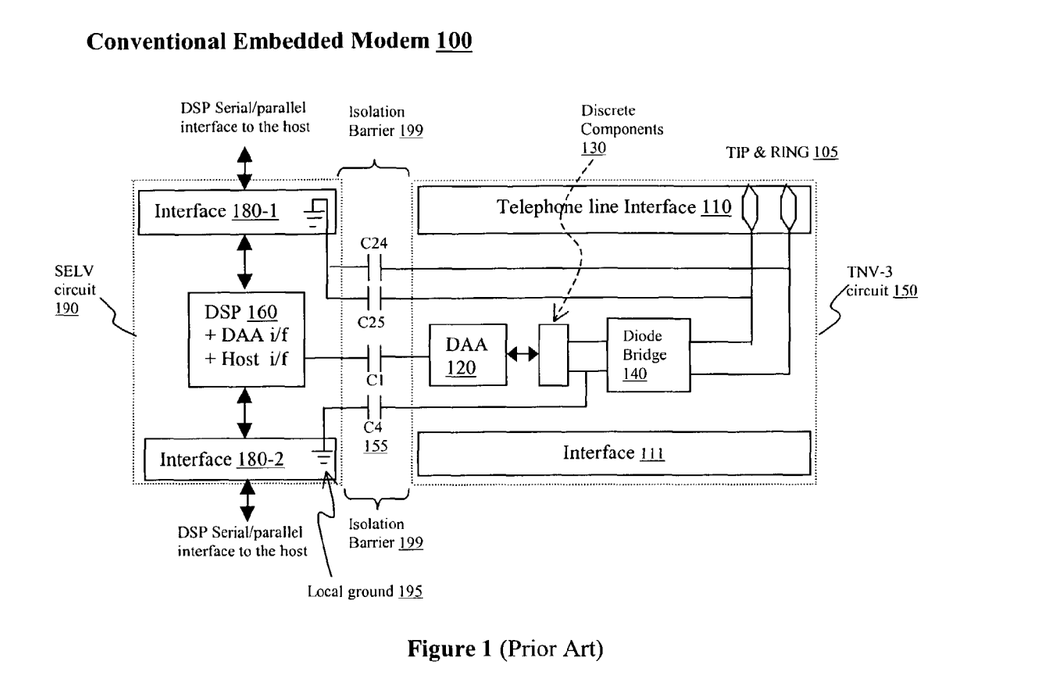
FIG. 1 depicts the building blocks of a conventional embedded modem.

An example of embedded modem 100 is shown in FIG. 1. The embedded modem 100 contains a front-end analog circuitry, which includes a Direct Access Arrangement (DAA) 120, a set of discrete components 130, a Diode Bridge 140, and a telephone line interface 110 where TIP and RING 105 reside. A modem is connected to the TIP and RING of a telephone line. The TIP and RING 105 from the telephone line are input to a diode bridge 140 to rectify input polarity. The rectified signals are then input to a set of discrete components 130 and DAA 120 to monitor the line voltage and to control the on-hook/off-hook switching, AC termination, DC termination, and ringer impedance, etc. The front-end analog circuitry must meet global telephone line requirements with full compliance to FCC, CTR21, JATE, and other country-specific PTT (post, telegraph, and telephone) specifications. The interface 111 is a null interface simply to provide additional mechanical supports for the modem. The embedded modem 100 also contains a Digital Signal Processor (DSP) chip 160 to handle the modem communication protocol. The DSP interface to DAA and the interface to an external host are integrated in the DSP chip 160 to minimize component count. The interface 180-1, 180-2 to an external host can be configured to operate as a serial bus or a parallel bus.

A modem must be tested by a National Certification Body (NCB) to ensure the product is in conformance with the relevant standard before the modem is used. The relevant standard for Telecommunications (IT) and Information Technology (ITE) equipment is the IEC 60950. Besides the safety compliance to IEC 60950, each country may have requirements beyond IEC 60950.

Due to safety and homologation requirements, it is often advantageous to separate the modem design from the rest of system design and select a pre-homologated modem as an add-on component for the system. A separate modem component minimizes the homologation cost and task, speeds up the system design cycle, and avoids a defective modem causing an entire system to be set aside.

In a modem design, there is a portion that is isolated from the local ground. The components in this portion that are isolated from the local ground are called the TNV-3 (Telecommunications Network Voltage) circuits. The TNV-3 circuits are subject to ringing voltage and lightning surges, and are not considered to be touched by a user. Circuits powered by low-voltage DC supplies in which no hazardous voltages are generated are called SELV (Safety Extra Low Voltage) circuits. SELV circuits are safe to touch by user and include local ground. All components from the telephone line interface 110 to DAA device 120 are in the TNV-3 circuit 150. The modem DSP 160 is in the SELV circuit 190.

Figure 2:
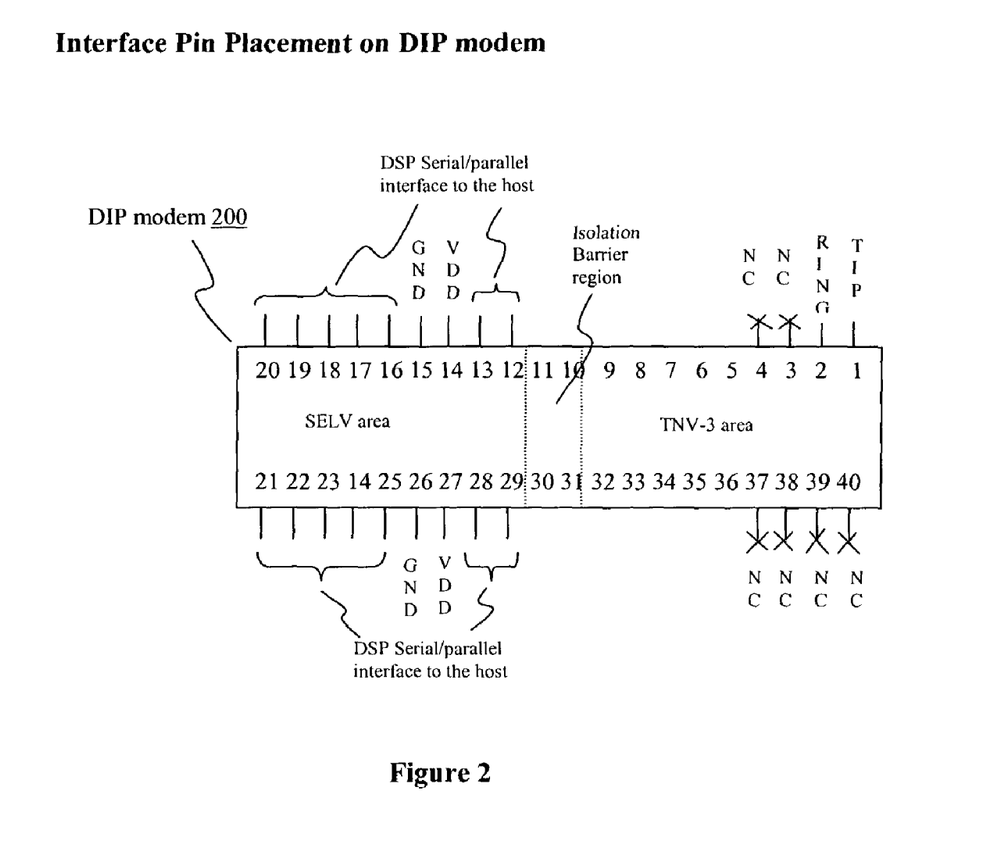
FIG. 2 depicts the placement of interface pins of an embedded modem, employing a dual in-line pin (DIP) design.

The area between the boundary of the TNV-3 circuit 150 and SELV circuit 190 is called the Isolation Barrier 199. It is a required insulation between the two circuits. For a modem to be compliant with global standards, under the worst-case conditions of ringing voltage and conductive dust pollutions, the required minimum insulation distance is 2.5 mm (0.1 inch) to prevent electrical arcing. The 2.5 mm minimum distance is applied from any printed circuit board (PCB) trace in the TNV-3 area 150 to SELV circuit 190 and from any PCB trace between TNV-3 150 and local ground 195. In FIG. 1, the high voltage capacitors C1, C4, C24, C25 155 are over the Isolation Barrier 199. The requirement of the Isolation Barrier 199 introduces constraints in the size of embedded modems as well as constraints in the placement of interface pins within the embedded modems. For example, both the Wintec SLM24xx DIP modem and the Conexant Socket Modem place interface pins at both sides of embedded modems to form a dual-in-line (DIP) package. FIG. 2 shows the placement of the interface pins on SLM24xx DIP modem 200. A DIP form factor is a common practice because most interface signals are on the SELV circuit side. But due to a high digital integration the SELV circuit occupies substantially less area than the TNV-3 circuit in an embedded modem. A solution to this design constraint is to place all digital interface signals around the SELV area, rather than to place only at one side of SELV area. For example, both DIP modem and Socket modem have 18 digital pins (including power/ground pins) connected to the SELV side, but only two interface signals (TIP and RING) are in the TNV-3 side. Thus, the high number of digital interface signals is divided and placed at both sides on these modems.

Another example is Insight's SLM2400i embedded modem, where the modem daughter card uses a dual-row header as the host interface connector at one end and a separate 4-pin strip header to connect TIP and RING signals to an external RJ11 phone jack at the opposite end of the modem.

The conventional approaches of placing interface signals at both sides of embedded modem in a dual-in-line form factor works fairly well, but there are some drawbacks. The conventional designs require two sets of pin headers in the modem assembly. The conventional designs also require two sets of sockets on the main-board to house the modem. All of these increase the modem manufacturing and integration cost. Another drawback is that a dual-in-line modem can be hard to insert into a socket on the main-board in case there is any misalignment or tilting between the socket and the header, etc.

SUMMARY OF THE INVENTION

The present invention is a compact embedded modem that meets global telephone standards with its interface constructed in a single-in-line form factor. The modem in single-in-line form factor, namely SIP modem, can be integrated into a host system through a single-in-line header socket. The SIP interface includes TIP and RING signals for connecting to a phone line, isolation spacers, ground pin, power pin, and digital signals for transferring data to and from the host. The digital interface can be configured to operate in serial connection or in parallel connection to the host, selectable by user.

BRIEF DESCRIPTION OF THE FIGURES

The present invention is illustrated by way of example, and not by way of limitation, in the figures of the accompanying drawings and in which like reference numerals refer to similar elements and in which.

DESCRIPTION OF THE PREFERRED EMBODIMENT

Figure 3:
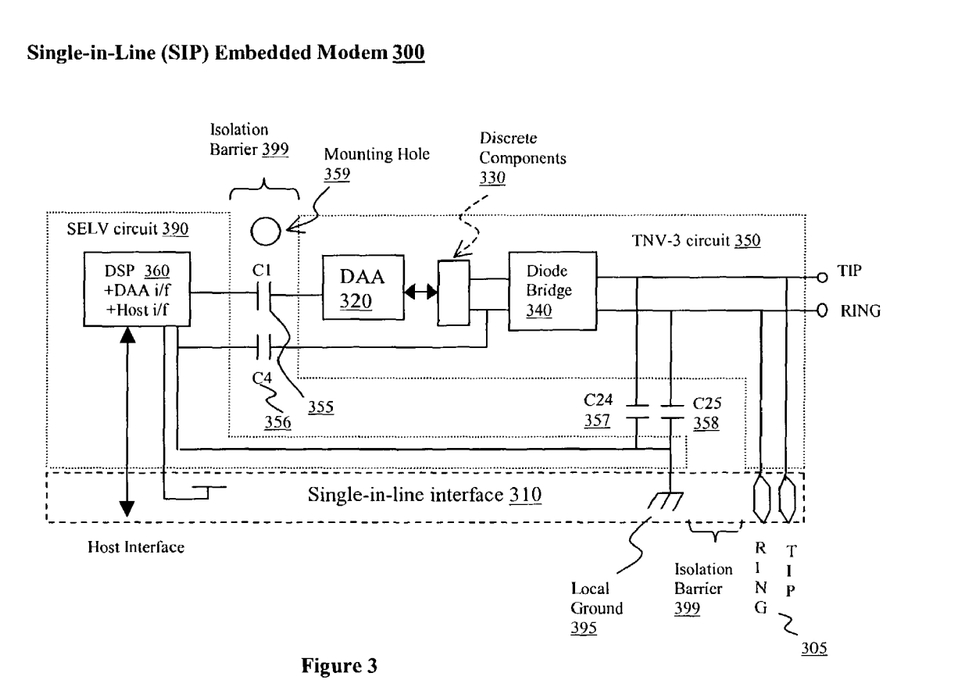
FIG. 3 depicts a single-in-line pin (SIP) embedded modem design according to an embodiment of the invention.

Referring to FIG. 3, the basic structure of a single-in-line (SIP) embedded modem of present invention is shown. A single-in-line embedded modem 300 contains an analog front end TNV-3 circuit 350, a digital SELV circuit 390, an Isolation Barrier 399, and a single-in-line (SIP) interface 310. The TNV-3 circuit includes TIP and RING 305, diode-bridge 340, discrete components 330 and DAA 320. The Isolation Barrier 399 separates the TNV-3 circuit 350 from the SELV circuit 390. The SELV circuit 390 contains a modem DSP chip 360 where the DSP interface to DAA and the DSP interface to the host are integrated in a single DSP chip 360 to minimize the component count on digital side. The DSP chip 360 in SELV 390 is connected to DAA 320 in TNV-3 350 through a high voltage isolation capacitor C1 355 over the Isolation Barrier 399. The capacitor C4 356 over Isolation Barrier 399 provides a current return-path from DAA 320 to local ground 395 to form a closed loop. The capacitors C1 355 and C4 356 serve three purposes. First, they transfer control signals and transmit data from DSP 360 to DAA 320. Secondly, they transfer receive and status data from DAA 320 to DSP 360. Finally, they provide "keep alive" power from DSP 360 to DAA 320 while modem is on-hooked. If off-hooked, the TNV-3 circuit 350 is powered by the loop-current drawn from the phone line. There is no system ground in the line side due to the electrical isolation requirement. The capacitors C24 357 and C25 358 connecting TIP and RING 305 to local ground 395 in SELV circuit 390 improve the modem emissions immunity. The local ground 395 is connected to the system ground on a main-board through the SIP interface 310.

To construct a single-in-line embedded modem, all digital interface signals in SELV circuit 390 must be routed to the same edge as the TIP and RING 305. To obey safety rules, the SIP modem 300 allocates a big portion of PCB area for the Isolation Barrier 399 to bring all digital interface signals to the side the same as the TIP and RING 305. This is different from the dual-in-line approach where to reduce the area of Isolation Barrier is a higher priority in minimizing the size of an embedded modem. The result is a long L-shape Isolation Barrier 399 on the single-in-line embedded modem 300. The area of Isolation Barrier 399 on SIP modem 300 is much larger than that of a conventional embedded modem 100 shown in FIG. 1. Although a much large portion of PCB area has been allocated for the Isolation Barrier 399 in a single-in-line modem 300, the final board area of the single-in-line modem 300 is not bigger than the area of a dual-in-line counterpart. For example, a SIP modem designed with Silicon Labs' Si24xx IsoModem™ chipset can be implemented in a 2"×1" PCB area, the same size as the DIP modem based on same chipset and still in conformance with global telephone safety standards. This is because the single-in-line approach only needs one PCB edge to mount the interface connector while a dual-in-line modem requires two edges of the PCB for the interface connection. The extra area occupied by the additional set of header in DIP modem offsets the area gain by its smaller Isolation Barrier.

A single-in-line modem also reduces the cost of the pin header by half because only one set of pin header is required, compared with two sets in the dual-in-line case. Similarly, a host system using a SIP modem only requires one header socket to house the SIP modem on the main-board, which also cuts the material cost of the socket by half, compared with the dual-in-line case. In case an embedded modem is directly soldered to the main-board without the need of a header socket, the board area occupied by a SIP modem is substantially smaller than that by a DIP modem.

Figure 4A:
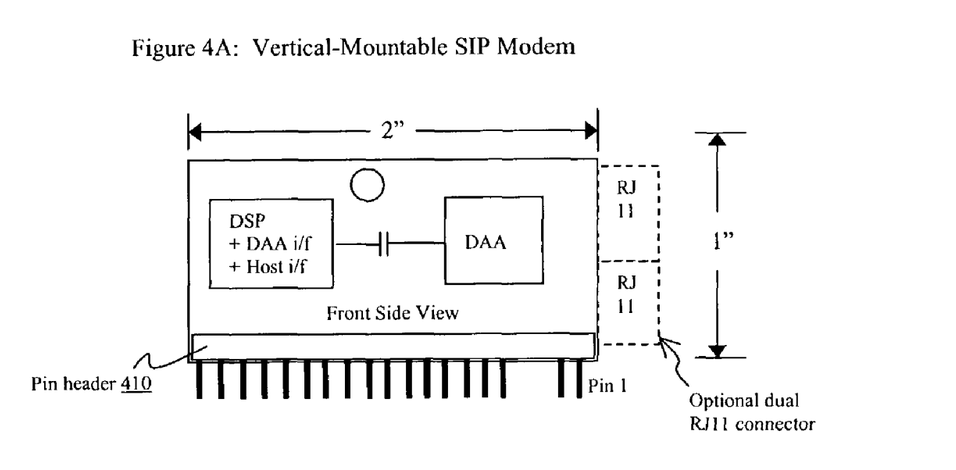
FIGS. 4A-B depict the SIP interface enables the modem to be mounted vertically or horizontally with respect to the main board.
Figure 4B:
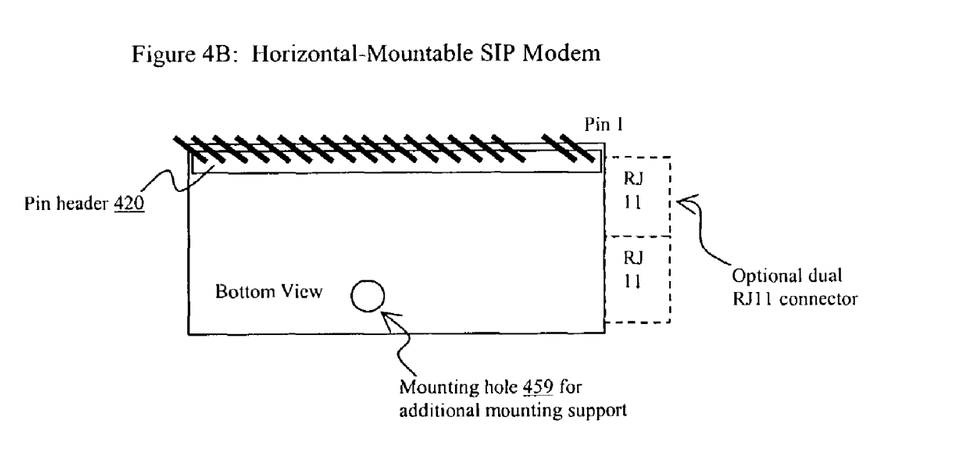

The single-in-line interface 310 provides additional flexibility in mounting the SIP modem 300 to a host system. It allows the modem to be mounted either in parallel with the system main-board or at a 90-degree angle with the main-board. A mounting hole 359 drilled in the Isolation Barrier area 399 at the side opposite to the SIP interface 310 provides an additional mechanical support when the SIP modem is mounted in parallel to the main-board. FIG. 4A shows the assembly of a pin header 410 in a SIP modem that can be vertically mounted on the main-board and FIG. 4B shows the assembly of a different pin header 420 in a SIP modem that can be horizontally mounted. In the horizontally mounting case, a mounting hole 459 can be used to provide additional mounting support.

Depending upon the need of applications, a single or dual RJ11 connector can be added to the embedded modem to allow a direct connection to the phone line. The TIP and RING at the optional RJ11 connector can be in connection with the TIP and RING pins at the SIP interface 310.

Figure 5:
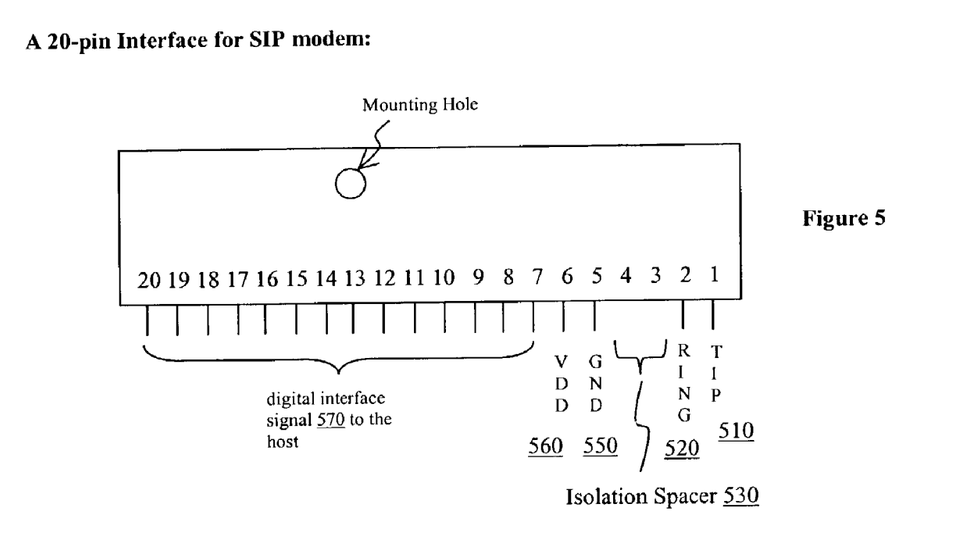
FIG. 5 depicts a 20-pin single-in-line interface for SIP modem according to an embodiment of the invention.

In yet another embodiment, FIG. 5 shows a 20-pin interface for a SIP modem, which includes TIP 510 and RING 520 to the phone line, two isolation spacers 530, one ground pin 550, one power pin 560, and 14 digital interface signals 570 to the host.

The telephone line signals, TIP 510 and RING 520, are grouped together and placed at one end of the interface. The order of TIP and RING is don't care. The diode bridge within the modem can rectify their input polarity to a right order. There is no explicit power supply pin in the TNV-3 region.

The DC line voltage derived across the TIP 510 and RING 520 can power components in TNV-3 region, including DAA, when off-hooked.

Two spare pins 530, i.e. pins 3 and 4, are used as an Isolation Barrier to separate the TIP and RING from the SELV circuit. There is no actual pin at pin 3 and pin 4. These are the isolation spacers. The number of spacer pins is arbitrary. Since the pins at popular pin header are on a 0.1" pitch, each spacer pin provides additional 0.1" isolation spacing between TNV-3 and SELV circuits to improve the lightning and surge safety. A minimum of one spacer pin is desirable at the interface.

Pin 5, the first pin of the SELV circuit, is a local ground (GND) 550, which is connected to the system ground on main-board. Placing the local ground 550 next to TIP and RING at the SIP interface effectively reduces the area of a SIP modem. The power pin (VDD) 560 is then placed next to the ground pin 550 to reduce the trace length from the capacitor terminals to the nearby power and ground when decoupling capacitors are added to the SIP modem to suppress the power and ground noises during signal switching. The order of TIP and RING, isolation spacer, then ground and power is an optimized characteristic of the SIP modem. The rest 14 pins are reserved for the digital interface signals 570 to communicate with the host. They can be arranged in any appropriate order.

The host interface in the DSP chip 360 in FIG. 3 allows the digital interface to the host to be configurable either as a serial UART interface with flow control or as a parallel 8-bit interface, selectable by user. The UART interface in most modems requires only nine signals to support serial transfer, including ground. Thus, in the serial mode the digital pins at the host interface is configured as the transmit data (TXD), receive data (RXD), request to send (RTS#), clear to send (CTS#), data carrier detect (DCD#), and ring indicator (RI#), plus auxiliary signals, such as escape (ESC), interrupt (INTO, clock output (CLKOUT), speaker audio output (AOUT) for progress monitoring, reset (RESET#), and unused pins. In the parallel mode, the digital interface can be configured as 8 data bits, one address bit, one chip select, one read enable, one write enable, one reset, and one interrupt pin that can be directly connected to a host bus.

Selection of a serial or parallel interface is determined by the state of a special pin (AOUT in the case of Silicon Lab's modem DSP chip) at the rising edge of RESET#. An internal 50K-ohm pull-up resistor at this special pin ensures the interface default to the serial mode operation. To force the interface into parallel mode, an external pull-down resistor of approximately 10K-ohm is connected to this pin.

The pins at a conventional header are placed on a 0.1" grid. Thus, a header to support a 20-pin SIP interface can be only 2-inch long. The header can be easily inserted into a header socket on the main-board. With a width of 0.1" for header socket, a 20-pin single-in-line socket only occupies 2"×0.1" area on the main-board, which makes the SIP modem attractive for a system where area is a premium. The pins at headers can also be placed on a 2 mm grid. Thus, a header to support a 20-pin SIP header can be only 4 cm long in this case.

The single-in-line modem is not limited to the embedded applications. It can be also used in PC applications. A soft modem is typically more cost effective in PC applications. A soft modem uses a component that is a subset of the DSP chip 360 shown in FIG. 3. The component includes an interface to DAA and a serial interface to the host, but without the DSP function. Soft modems are used in applications where the host CPU has huge excessive computing power. The algorithm performed by a traditional modem DSP can be emulated by the computing power of CPU. A soft modem in the single-in-line form factor is attractive to slim case PC where area is premium and in many cases only containing one single expansion slot. A single-in-line soft modem does not use up a bus expansion slot, such as an ISA bus slot or a PCI bus slot, when adding a modem function to a computer. A single-in-line soft modem can be plugged into a compact header socket on PC motherboard and connected to an UART port available at PC chipset to provide the serial communication function for the system.

Having disclosed exemplary embodiments and the best mode, modifications and variations may be made to the disclosed embodiments while remaining within the subject and spirit of the invention as defined by the following claims

The invention claimed is:

1. A single-in-line modem constructed on a printed circuit board having a portion for analog circuits and a portion for digital circuits, the single-in-line modem comprising:
   an analog circuit configured to bi-directionally communicate with an external data communication equipment over a phone line using an analog protocol;
   a digital circuit isolated from the analog circuit and configured to bi-directionally communicate with a host system over a digital interface;
   an isolation region with a predetermined separation distance between the analog circuit and the digital circuit on the printed circuit board to protect from over-voltage hazards;
   a set of isolation capacitors over the isolation region to connect the digital circuit and the analog circuit;
   at most one pin header coupled with the printed circuit board and disposed along an edge of the printed circuit board;
   at most one single-in-line interface having at most one single row of pins selectively coupled to the analog circuit and the digital circuit, the single row of pins protruding from the pin header in a direction parallel to or coplanar with the printed circuit board for enabling the printed circuit board to be vertically coupled with a second printed circuit board, the single row of pins including at least an isolation spacer, a ground pin, and a power pin, the ground pin being disposed between the isolation spacer and the power pin and wherein the isolation region includes at least a first section, a second section, and a third section, the first section being connected to the third section through the second section, the first section being perpendicular to the second section, the second section being perpendicular to the third section.

2. The single-in-line modem of claim 1, wherein the analog circuit includes:
   a diode bridge to rectify the inputs from the external data communication equipment;
   a set of discrete components to match the impedance and the power dissipation requirement of the external communication equipment;
   a direct access arrangement; and
   an interface to the isolation capacitors, from which to connect to the digital circuit.

3. The single-in-line modem of claim 1, wherein the digital circuit includes:
   a digital signal processor configured to process digital data related to the communication protocol,
   an interface to the isolation capacitors, from which to connect to the analog circuit, and an interface to the host system on a main-board. The digital signal processor, the interface to isolation capacitor, and the interface to the host system are integrated in a single chip.

4. The single-in-line modem of claim 1, wherein the digital circuit includes:
a controller chip that contains an interface to the isolation capacitors, from which to connect to the analog circuit, and an interface to the host system to handle data transfers between the host and the modem.

5. The single-in-line modem of claim 1 further comprising a mounting hole disposed in the isolation region and disposed at a second edge opposite to the single-in-line interface, the mounting hole being configured to provide additional mechanical support.

6. The single-in-line modem of claim 1, wherein:
the single-in-line interface including at least a digital interface configured as a parallel interface that includes an 8-bit data bus, an address bus, interrupt, reset, chip select, write enable, and read enable signals.

7. The single-in-line modem of claim 1, wherein:
the single row of pins includes at least digital signals configurable to a serial interface to connect to a host system, selectable by user.

8. The single-in-line modem of claim 7, wherein:
the serial interface includes transmit data, receive data, request to send, clear to send, data carrier detect, ring indicator, reset, auxiliary signals for status monitoring, and unconnected reserved for future use pins.

9. The single-in-line modem of claim 1, wherein:
the pin header is a 20-pin single row connector header.

10. The single-in-line modem of claim 9 wherein pin positions of the pin header are on 0.1" pitch.

11. The single-in-line modem of claim 9 wherein pin positions of the pin header are on 2 mm pitch.

12. The single-in-line modem of claim 9 wherein the pin header contains a pin assignment in an order of TIP and RING positions, empty space pin positions, a ground pin position, a power pin position, and then digital signal pin positions, wherein the TIP and RING positions are exchangeable, and wherein the digital pin positions are exchangeable.

13. The single-in-line modem of claim 1 further comprising at least a dual RJ11 connector coupled with at least a TIP pin and a RING pin of the single row of pins.

14. The single-in-line modem of claim 1, wherein:
a single-in-line pin connector is mounted to the printed circuit board so that the single-in-line modem is adapted to mount vertically with respect to a main-board.

15. The single-in-line modem of claim 1, wherein:
a single-in-line pin connector is mounted to the printed circuit board so that the single-in-line modem is adapted to mount horizontally with respect to a main-board.

16. The single-in-line modem of claim 1, further comprising:
a mounting hole to provide additional mechanical support when the single-in-line modem is mounted horizontally with respect to a main board.

17. The single-in-line modem of claim 1, further comprising:
a separate RJ11 connector for TIP and RING connection.

18. A single-in-line modem constructed on a printed circuit board having a portion for analog circuits and a portion for digital circuits, the single-in-line modem comprising:
an analog circuit configured to bi-directionally communicate with an external data communication equipment over a phone line using an analog protocol;
a digital circuit isolated from the analog circuit and configured to bi-directionally communicate with a host system over a digital interface;
an isolation region with a predetermined separation distance between the analog circuit and the digital circuit on the printed circuit board to protect from over-voltage hazards;
a set of isolation capacitors over the isolation region to connect the digital circuit and the analog circuit;
at most one pin header coupled with the printed circuit board and disposed along an edge of the printed circuit board;
at most one single-in-line interface having at most one single row of pins selectively coupled to the analog circuit and the digital circuit, the single row of pins protruding from the pin header in a direction parallel to or coplanar with the printed circuit board for enabling the printed circuit board to be vertically coupled with a second printed circuit board, the single row of pins including at least an isolation spacer, a ground pin, and a power pin, the ground pin being disposed between the isolation spacer and the power pin; and
a mounting hole structure disposed in the isolation region and disposed at a second edge opposite to the single-in-line interface, the mounting hole being configured to provide additional mechanical support.

19. The single-in-line modem of claim 18, wherein the analog circuit includes:
a diode bridge to rectify the inputs from the external data communication equipment;
a set of discrete components to match the impedance and the power dissipation requirement of the external communication equipment;
a direct access arrangement; and
an interface to the isolation capacitors, from which to connect to the digital circuit.

20. The single-in-line modem of claim 18, wherein the digital circuit includes:
a digital signal processor configured to process digital data related to the communication protocol,
an interface to the isolation capacitors, from which to connect to the analog circuit, and
an interface to the host system on a main-board. The digital signal processor, the interface to isolation capacitor, and the interface to the host system are integrated in a single chip.

21. The single-in-line modem of claim 18, wherein the digital circuit includes:
a controller chip that contains an interface to the isolation capacitors, from which to connect to the analog circuit, and an interface to the host system to handle data transfers between the host and the modem.

22. The single-in-line modem of claim 18, wherein:
the isolation region includes at least a first section, a second section, and a third section, the first section being connected to the third section through the second section, the first section being perpendicular to the second section, the second section being perpendicular to the third section.

23. The single-in-line modem of claim 18, further comprising:
a separate RJ11 connector for TIP and RING connection.

24. The single-in-line modem of claim 18, wherein:
the single-in-line interface including at least a digital interface configured as a parallel interface that includes an 8-bit data bus, an address bus, interrupt, reset, chip select, write enable, and read enable signals.

25. The single-in-line modem of claim 18, wherein:
the single row of pins includes at least digital signals configurable to a serial interface to connect to a host system, selectable by user.

26. The single-in-line modem of claim 25, wherein:
the serial interface includes transmit data, receive data, request to send, clear to send, data carrier detect, ring indicator, reset, auxiliary signals for status monitoring, and unconnected reserved for future use pins.

27. The single-in-line modem of claim 18, wherein:
the pin header is a 20-pin single row connector header.

28. The single-in-line modem of claim 27 wherein pin positions of the pin header are on 0.1" pitch.

29. The single-in-line modem of claim 27 wherein pin positions of the pin header are on 2 mm pitch.

30. The single-in-line modem of claim 27 wherein the pin header contains a pin assignment in an order of TIP and RING positions, empty space pin positions, a ground pin position, a power pin position, and then digital signal pin positions, wherein the TIP and RING positions are exchangeable, and wherein the digital pin positions are exchangeable.

31. The single-in-line modem of claim 18 further comprising at least a dual RJ11 connector coupled with at least a TIP pin and a RING pin of the single row of pins.

32. The single-in-line modem of claim 18, wherein:
a single-in-line pin connector is mounted to the printed circuit-board so that the single-in-line modem is adapted to mount vertically with respect to a main-board.

33. The single-in-line modem of claim 18, wherein:
a single-in-line pin connector is mounted to the printed circuit board so that the single-in-line modem is adapted to mount horizontally with respect to a main-board.

34. The single-in-line modem of claim 18, wherein the mounting hole provides the additional mechanical support when the single-in-line modem is mounted horizontally with respect to a main board.

* * * * *